March 2, 1943. W. TRAUPEL 2,312,605
GAS TURBINE PLANT
Filed Dec. 9, 1939 2 Sheets-Sheet 1

INVENTOR
Walter Traupel
BY
Pennie, Davis, Marvin & Edmonds
ATTORNEYS

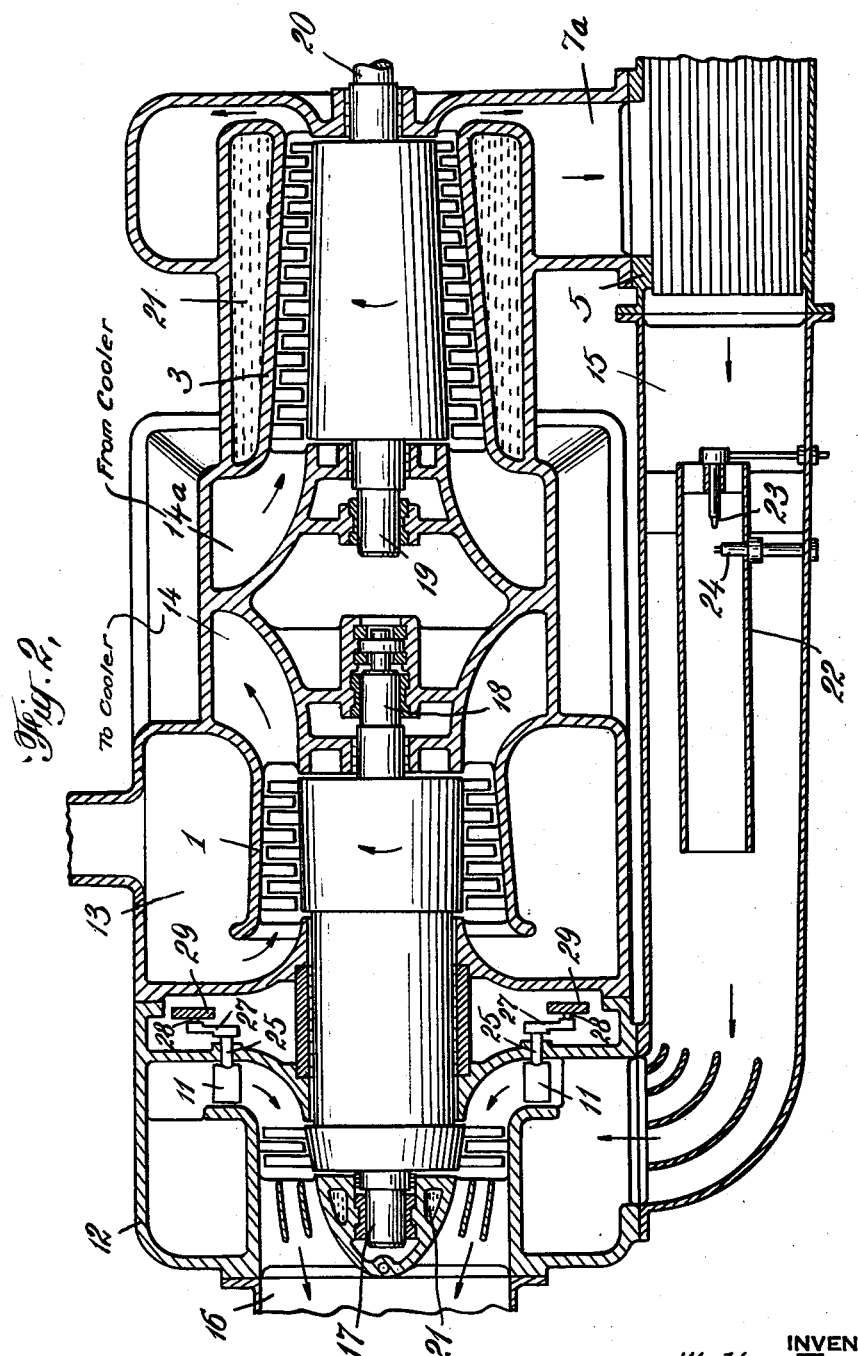

Patented Mar. 2, 1943

2,312,605

UNITED STATES PATENT OFFICE 2,312,605

GAS TURBINE PLANT

Walter Traupel, Winterthur, Switzerland, assignor to Sulzer Frères, Société Anonyme, Winterthur, Switzerland Application December 9, 1939, Serial No. 308,409
In Switzerland December 24, 1938

3 Claims. (Cl. 60—41)

The invention relates to a gas turbine plant with at least two compressors arranged in series and driven by turbines, at least one of the turbines having adjustable guide blades; the invention consists in that the exhaust gases from the turbine delivering power outside the plant are used to work a turbine that drives a precompressor, and the output of this turbine is adjusted according to the different service requirements by means of rotatable guide blades.

Adjustable guide blades have already been proposed for turbines, particularly for hydraulic turbines, but also for gas turbines. In these known turbines, however, the purpose of the adjustable blades is only to alter the cross-sectional area of flow and thereby the volume flowing through per second. The energy drop available in one stage is, however, not changed, and to a certain extent neither is the direction of flow of the gases changed.

Through this invention, however, the weight of exhaust gases flowing through the guide blades per second is changed in a manner contrary to that adopted in known turbines. If, for example, the guide-wheel cross-section is diminished, the pressure before the guide wheel increases, since the whole quantity of gas dealt with in the plant must flow through in spite of the diminished cross-section of flow. Accordingly the heat drop becomes greater, and thereby also the output of the turbine. The speed of the turbine increases in accordance, so that the precompressor delivers a greater quantity of air. In consequence, more air or gas is then passed through the whole plant and the output is increased.

In addition, according to the invention there is also the advantage that the change of angle, which is connected with the reduction or increase of the cross-section of flow by adjusting the guide wheel, takes place in the correct sense, so that no knocking action occurs on the runner blades with the changed speed of flow of the gases, since the velocity diagrams are altered in corresponding sense.

The adjustable guide blades are preferably designed and arranged in such a way that the gas flows through them in radial direction. Between the adjustable guide blades and the following runner blades the gas stream may be diverted in such a way that the gas flows through the runner blades in axial direction.

An example of construction according to the invention is illustrated diagrammatically and in a simplified manner in the drawings.

Fig. 2 illustrates a construction of the turbine that drives the precompressor.

Figure 1:
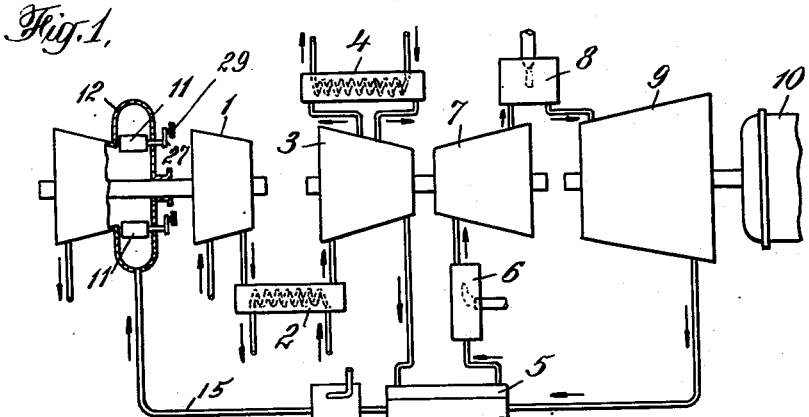
Fig. 1 shows a gas turbine plant diagrammatically.

By the precompressor 1 (Fig. 1) air is drawn in and delivered in a precompressed state to the cooler 2. A multi-stage main compressor 3 compresses the air further, with intermediate cooling in the intermediate cooler 4, and then delivers it into the recuperator 5. In the heater 6 the air is further heated by means of the combustion of fuel. The power gas thus obtained enters a first turbine 7 which drives the main compressor 3. After issuing from the first turbine 7 the power gases are further heated in a heater 8 by direct combustion of fuel. The power gases then flow into the main turbine 9 that gives up power from the plant, for example by driving the electric generator 10. The exhaust gases pass through the recuperator 5 into the exhaust-gas turbine 12 which is fitted with adjustable guide blades 11; from there the gases are exhausted to atmosphere.

The auxiliary turbine 12 (Fig. 2), the precompressor 1 and the main compressor 3 are united to form one block. From the suction space 13 the precompressor 1 withdraws air and delivers it through passage 14, a cooler (not shown) and passage 14a to the main compressor 3. From the delivery space 7a of the main compressor, the air passes into the recuperator 5 and from there into the further non-illustrated part of the gas turbine plant. After expanding in this part (not shown in the drawings) the power gases flow again into the recuperator 5 and then through pipe 15 to turbine 12 and leave the latter through the passage 16.

The bearings 17, 18, 19 and 20 are located within the block, since the air or the power gas in it is still at low temperatures. The bearings are thereby not unduly heated. In addition, special cooling jackets 21 are also provided in order to prevent any impermissible increase of the temperatures.

In the pipe 15 a burner 22 is also provided, which has a fuel nozzle 23 and an ignition device 24. The purpose of this burner is, when load is suddenly increased, to increase temporarily the temperature of the power gas before the inlet into the auxiliary turbine to such an extent that by quickly increasing the speed of the auxiliary turbine the output of the whole plant can be suited in the shortest possible time to the increased service requirements. The burner 22 remains only quite a short time in operation until the desired increase in output has been reached; it is then immediately shut down. The machine runs no risk of being damaged by too high temperatures.

Figure 3:
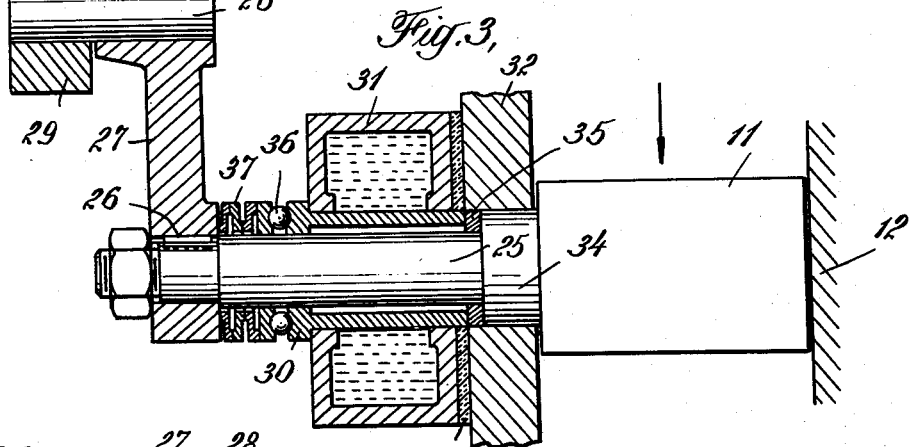
Figs. 3, 4 and 5 show various details of the turbine in Fig. 2.

The adjustable guide blades 11 (Fig. 2) may be designed as shown in Fig. 3. Each guide blade has a shaft 25, the axis of which is parallel to the axis of the turbine. At one end of the shaft a lever 27 is fixed by the key 26. The pin 28 is in connection with an adjusting member 29. The bearings 30 are surrounded by cooling jackets 31, through which a cooling medium flows. Between the cooling jacket 31 and the casing 32 of the turbine a layer 33 of heat insulating material is inserted; this prevents heat passing from the casing to the bearing. Between the bearing 30 and a collar 34 on the blade shaft, a thrust member 35 is fitted. At the opposite end of the shaft a ball bearing 36 and springs 37 are inserted, so that when the collar 34 rests on the thrust member 35 the axial position of the blade is determined.

The bearing 30 may be designed as a plain bearing or, for instance, also as a roller bearing.

Figure 4:
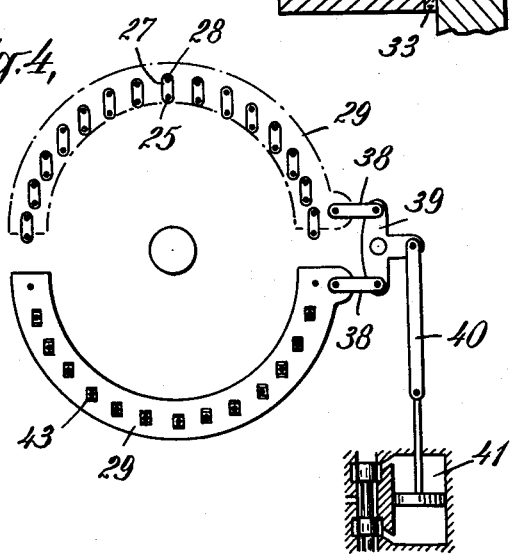

The levers 27 (Fig. 4), which belong to one half of the set of guide blades, are all arranged parallel to each other and are connected to an adjusting member 29 in such a way that all blades are turned through the same angle. The two adjusting members 29 are connected by means of the links 38 to a lever 39, which is in turn connected by the rod 40 to the servo-motor 41.

Figure 5:
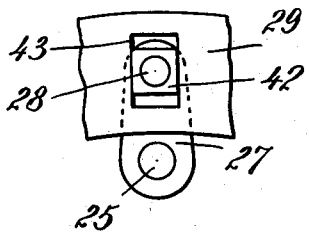

Two of the levers 27 are directly pivoted in the adjusting members 29. The other levers are not supported direct in the adjusting members 29, but, as shown in Fig. 5, are at first held in a sliding block 42, which slides in a slot 43. In this way any jamming of the adjusting device or a non-uniform setting of the turbine blades is prevented, even when the various elements expand unequally under the influence of heat, and particularly when loads are varying.

I claim:

1. A gas turbine plant which comprises an exhaust gas turbine having adjustable guide blades, a precompressor driven by the exhaust gas turbine, a first turbine, a main compressor driven by the first turbine, a main turbine arranged to drive a power means, a cooler, conduit connecting the cooler to the precompressor and the main compressor, whereby the compressed air is cooled before it enters the main compressor, an intermediate cooler connected by conduit to the main compressor whereby the compressed air may be cooled in an intermediate stage, a recuperator, a heater; conduit connecting the delivery end of the main compressor with the recuperator, the heater and the first turbine, whereby the air is heated in the recuperator, further heated in the heater and then passed into the first turbine, a second heater connected by conduit to the exhaust side of the first turbine and to the intake side of the main turbine, a single conduit connecting the exhaust side of the main turbine with the recuperator and with the intake side of the exhaust gas turbine, whereby all the exhaust gas from the main turbine passes through the recuperator and over the adjustable guide blades of the exhaust gas turbine.

2. A gas turbine plant which comprises a main compressor, means for driving the main compressor, a fuel burner, means for passing gas from the main compressor to the fuel burner to burn the fuel, thereby increasing the energy of the gas, a main turbine, conduit for passing gas from the fuel burner to the main turbine, said main turbine being arranged to drive a power machine, an exhaust gas turbine, conduit means for passing all the gas from the main turbine to the exhaust gas turbine, a plurality of rotatably adjustable guide blades arranged to guide the gas entering the exhaust gas turbine, single means for adjusting a plurality of the guide blades simultaneously, a precompressor arranged to supply air under pressure to the main compressor, and means for driving the precompressor by the exhaust gas turbine.

3. A gas turbine plant which comprises an exhaust gas turbine with adjustable guide blades, a precompressor driven by the exhaust gas turbine, a main compressor, a first turbine for driving the main compressor, a main turbine for delivering power outside the plant, a connecting conduit between the precompressor and main compressor, a recuperator and at least one heater, conduit connecting the delivery branch of the main compressor, the recuperator, the heater and the first and main turbines together in such a way that the air supplied by the main compressor is first preheated in the recuperator, is then heated in the heater, and then passes in series into the first and main turbines; conduit connecting the exhaust gas branch of the main turbine, the recuperator and the intake opening of the exhaust gas turbine with each other in such a way that all the exhaust gas from the main turbine first flows through the recuperator, where it gives up a part of its heat to the air supplied by the main compressor, and is then led to the exhaust gas turbine.

WALTER TRAUPEL.